April 13, 1937. J. S. ALSPAUGH 2,076,974
POWER TRANSMITTING MECHANISM
Filed Feb. 11, 1935 3 Sheets-Sheet 1

Inventor
JAMES S. ALSPAUGH
By
Attorneys

April 13, 1937. J. S. ALSPAUGH 2,076,974
POWER TRANSMITTING MECHANISM
Filed Feb. 11, 1935   3 Sheets-Sheet 2

Inventor
JAMES S ALSPAUGH
Attorneys

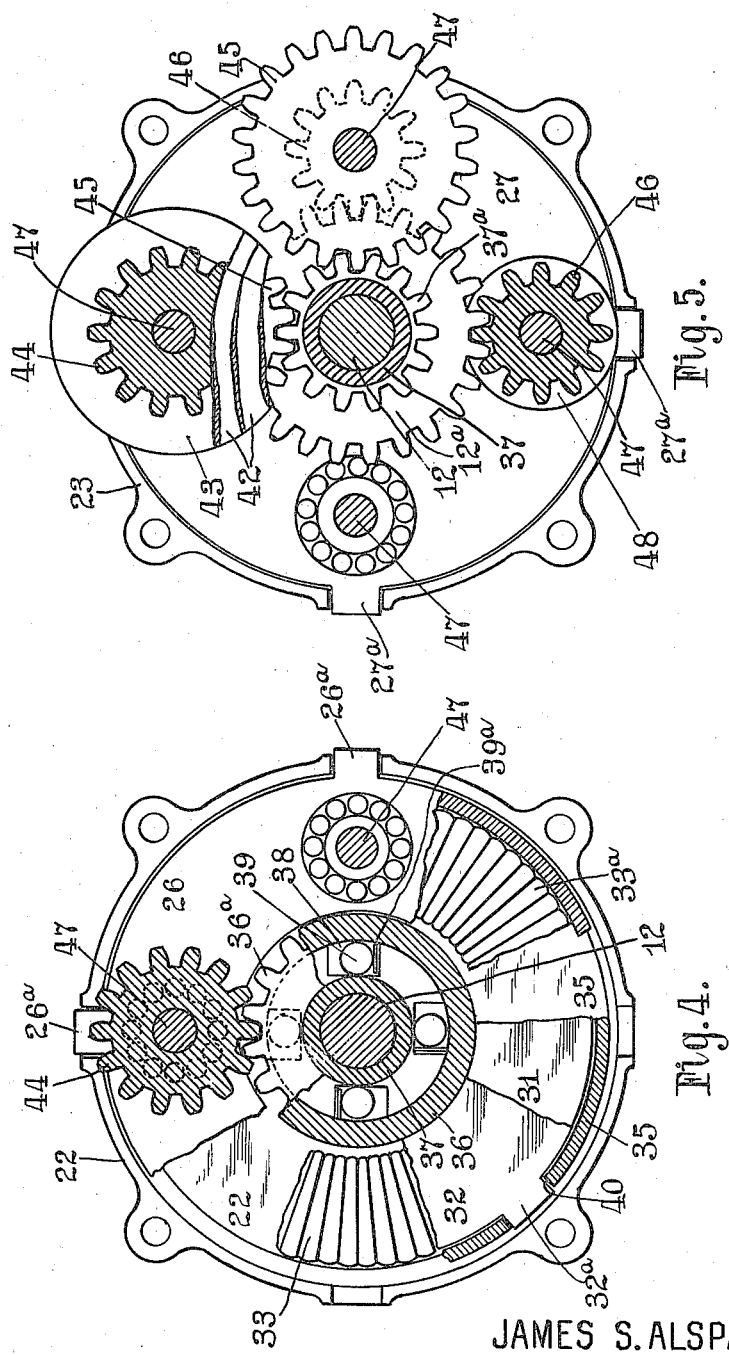

Patented Apr. 13, 1937

2,076,974

UNITED STATES PATENT OFFICE 2,076,974

POWER TRANSMITTING MECHANISM

James S. Alspaugh, Columbus, Ohio

Application February 11, 1935, Serial No. 5,989

9 Claims. (Cl. 74—259)

This invention relates to power transmitting means and while it is particularly adapted for driving motor vehicles, airplanes or ships it can be used for other purposes.

The main object of the invention is to dispense with much of the gear shifting mechanism such as employed at the present time in motor vehicles and to provide means whereby after rotations of the crank shaft are established the power can be applied to an intermediate or driven shaft with a uniform force automatically increasing as the rotary momentum of said intermediate shaft increases until a maximum is reached for a given supply of fuel to the engine. This principle of operation applies at all times whether the engine is idling or doing work and if the fuel supply is increased.

For example with my invention the intermediate or driven shaft can be engaged directly and initially with the power shaft and without the use of an intermediate or low gear by means of a hand operated single gear shift and the speed of the vehicle thereafter varied up or down by merely varying the fuel supply with the usual accelerator. In this statement it is assumed that the car is being driven forward on a level surface. When an upgrade is to be essayed the speed decreases when the fuel supply is uniform and the transmission mechanism automatically adapts itself to such change in speed. On a down grade road the mechanism cooperates with the engine to resist an excess of speed.

In the accompanying drawings there is illustrated one example of the construction as designed for use in a motor vehicle.

In said drawings—

Fig. 4 is primarily a section on the line IV—IV Fig. 1 looking to the left and with adjacent parts broken out to show details of some of the interior parts carried by the rotary frame.

Fig. 5 is a view looking to the right of said line IV—IV also showing adjacent parts broken out.

Figure 1:
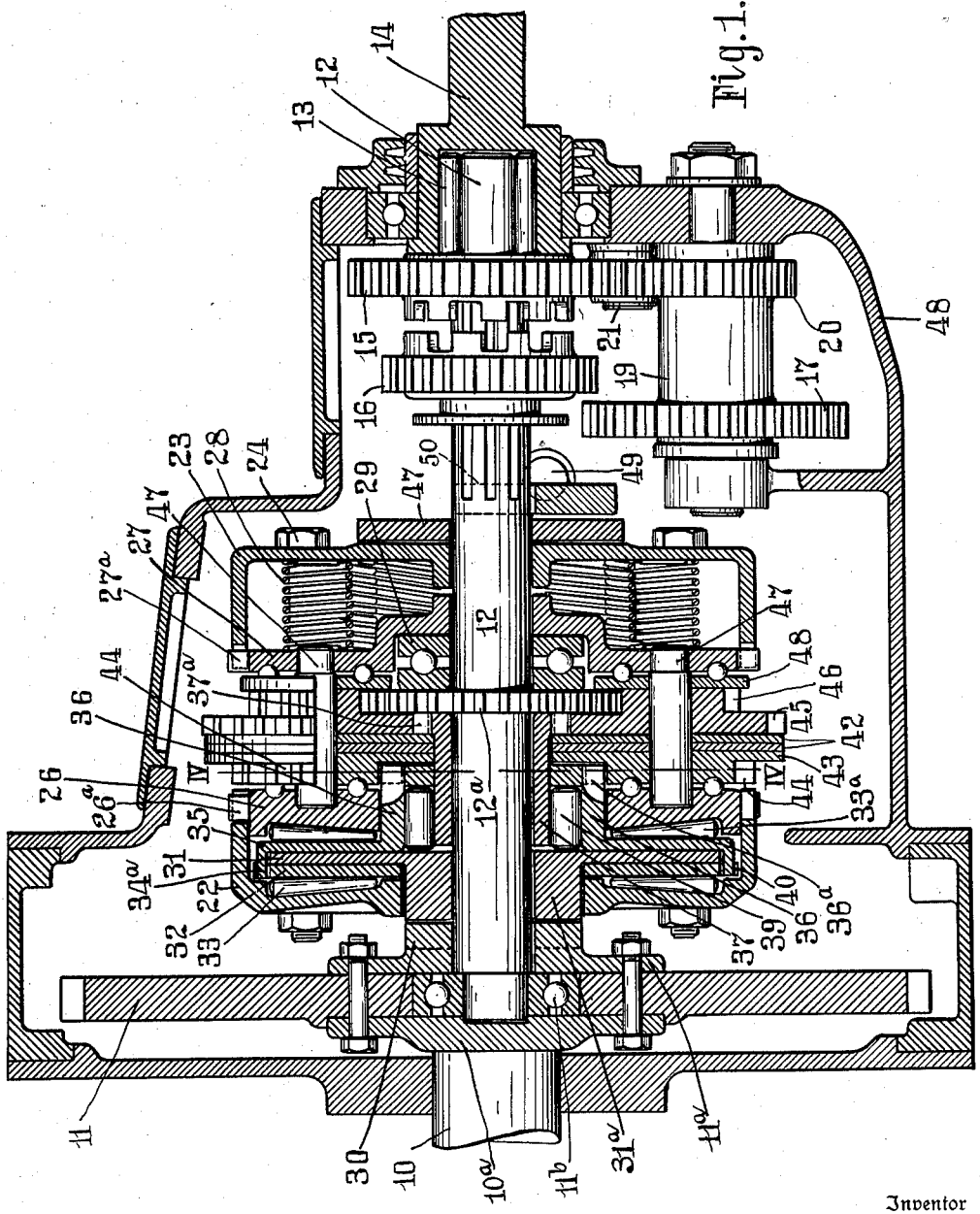
Figure 1 is a central vertical section of the mechanism with parts in full.
Figure 3:
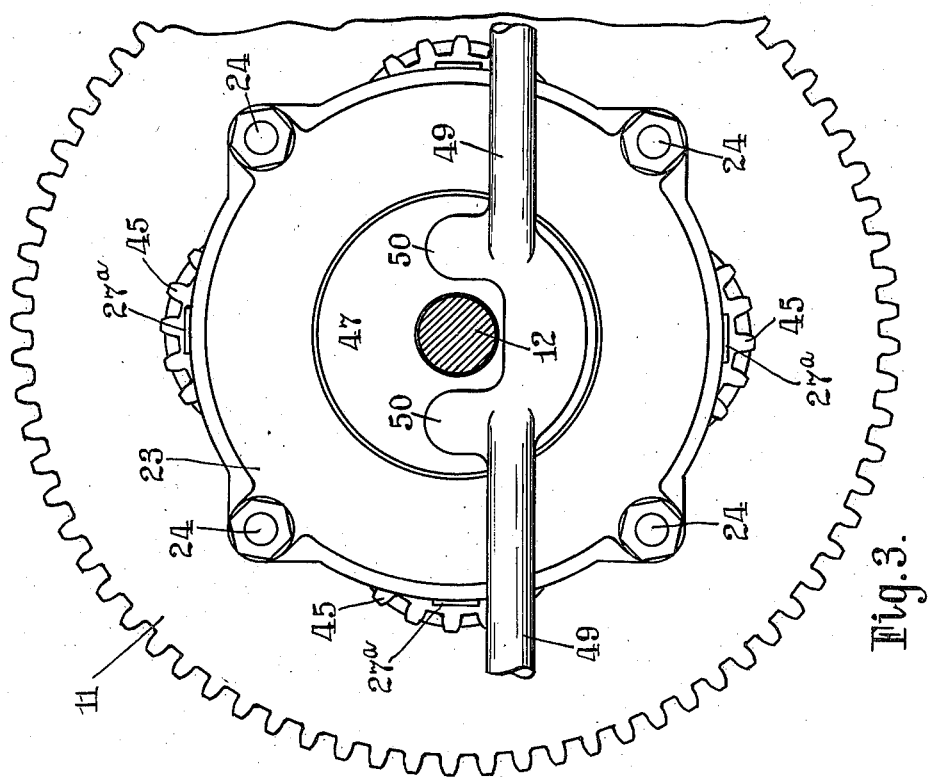
Fig. 3 is an elevation of the right hand end of what is shown in Fig. 2, the shaft upon which the rotary frame rotates being in section and the fly-wheel shown in Fig. 1 added.
Figure 2:
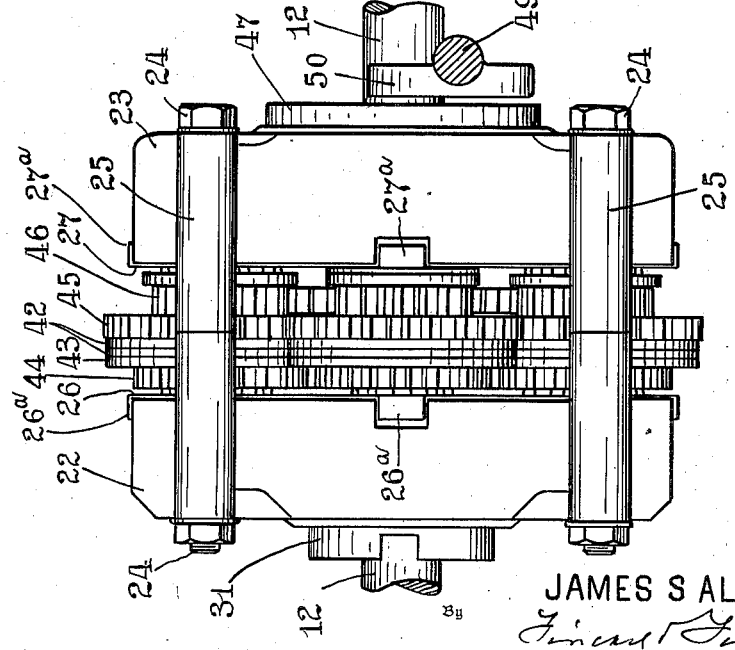
Fig. 2 is a side elevation of the rotary frame containing the gear and the clutching means.

In the views 10 designates the crank shaft of the engine which has affixed thereto a hub plate 10ᵃ between which and a similar hub plate 11ᵃ is bolted the fly wheel 11 toothed at its rim for cranking or starting. The wheel 11 is centrally perforated to receive the forward end of an intermediate or driven shaft 12. The said shaft 12 has fixed to it near its middle a large toothed gear 12ᵃ. The forward end of the intermediate shaft 12 is extended through the hub plate 11ᵃ and it turns in a ball bearing 11ᵇ seated in the aforesaid central opening of the fly wheel.

At its rear end the shaft 12 is supported by roller bearings 13 in the forward socketed end of the usual driven shaft 14 which, through a universal joint (not shown) is connected with the shaft that drives the differential operating the rear wheels of the vehicle.

The forward end of the driven shaft 14 has fixed to it a drive gear 15 that has its forward face provided with clutch teeth to be engaged by a sliding gear 16 having similar teeth and splined on the intermediate shaft 12, said sliding gear 16 being operable by a hand lever (not shown) to operatingly connect the intermediate driven shaft 12 with the driven shaft 14 for forward driving, said driving being direct. The sliding gear 16 can be shifted to engage a gear 17 for reverse driving, said gear 17 being on an off-standing shaft 19 and by a gear 20 on said shaft engaging an intermediate idler 21 that meshes with both the gears 15 and 20.

Mounted loosely on the intermediate shaft 12 are two frame heads 22 and 23 bolted rigidly together by four bolts 24, said bolts being extended through spacing projections 25 to connect said heads in conjunction with the bolts in fixed spaced relation to each other so that the frame, as a unit, can be moved longitudinally on said intermediate shaft and for the purpose as hereinafter stated.

Mounted on the intermediate shaft 12 between said frame heads 22 and 23 are two plates 26 and 27 that have at their rims four lugs 26ᵃ and 27ᵃ that engage recesses on the inturned rims of the frame heads 22 and 23 so that the united frame heads can be slightly slid longitudinally on the intermediate shaft 12 with respect to said plates 26 and 27. Said plates 26 and 27, by reason of their said engagement with the head plates 22 and 23, rotate on the shaft 12 with the latter.

Between the frame head 23 and the plate 27 are inserted a number of coil springs 28 tending normally to hold the united frame heads rearward with reference to said plates 26 and 27.

On the shaft 12 between plate 27 and the gear 12ᵃ is a thrust bearing 29 to support the plate 27 against movement on the intermediate shaft longitudinally by reason of the pressure of the springs 28.

The rear face of the fly wheel hub member 11ᵃ is provided with clutch teeth at 30 that engage corresponding clutch teeth on the hub of a friction clutch plate 31 provided with a hub 31ᵃ that turns freely on the intermediate shaft 12. A ring clutch plate 32 is loosely supported at the forward side of the friction clutch plate 31 on the hub 31ᵃ of the latter; and forward of and between the ring clutch plate 32 and the frame head 22 is an annular series of frusto-conical roller bearings 33, so that normally the springs 28 cause friction pressure of the ring clutch plate 32 on the clutch plate 31. The rim of the ring clutch plate has lugs 32ᵃ.

In rear of the friction clutch plate 31 is mounted a clutch member 35 provided with a rearwardly extended hub-like portion 36 that is cut at its rear end with gear teeth 36ᵃ. Said clutch member is supported on a sleeve 37 turning freely on the intermediate shaft 12. Said sleeve 37 is made on its rim with a series of recesses 38 in which are placed clutch rollers 39 that lie loosely between the hub member 36 and said sleeve 37 to temporarily lock the sleeve and clutch member for rotation together. The rollers 39 are normally kept in contact with the inner surface of the hub by springs 39ᵃ as usual in this sort of locking bearing. The flange at the rim of the clutch member 35 is provided with recesses 40 to receive the lugs 32ᵃ of clutch ring 32 to cause those clutch members to rotate together and to permit free movement longitudinally as respects the drive shaft and cause clutching engagement with and release from plate 31.

At its rear end the sleeve 37 is provided annularly with external gear teeth 37ᵃ.

Between the forward plate 26 and the rear face of clutch member 35 is an annularly arranged series of frusto-conical roller bearings 33ᵃ that support the clutch member 35 when the clutches are engaged and permit free movement of the rotary frame in reference to the clutch.

In rear of the clutch system just described is a second clutch system of a planetary style. Said planetary system includes four groups of friction and gear members, each comprised of four parts as follows: A pair of plain disks 42 frictionally contactible with each other, a disk 43 at the forward side of the pair of disks 42, said disk 43 having a concentric gear wheel 44 affixed on its forward face, and a larger gear wheel 45 having a smaller gear 46 fixed on its face, said double gear wheel 45—46 being at the rear side of the pair of disks 42. Each of said groups of four members is mounted loosely on a short shaft 47 journaled in the plates 26 and 27, before referred to, so as to have a slight play longitudinally. On each of said short shafts 47 also is a circular bearing plate 48 interposed between which and the plate 27 are ball bearings, as shown. Between each of the gears 44 and the plate 26 are ball bearings as shown. The purpose of these ball bearings is to promote free rotations of the rotary frame and circular movements of the adjacent parts.

The gear teeth 36ᵃ mesh with the gear wheel 44; the gear wheel 45 meshes with the gear teeth 37ᵃ on the rear end of the sleeve 37, and the gear wheel 46 meshes with the gear wheel 12ᵃ on the intermediate shaft 12.

47 designates a circular thrust plate loose on the intermediate shaft 12 in rear of the rotary frame head 23.

The mechanism described is inclosed in a suitable housing 48.

Suitably journaled in said housing is a rock shaft 49 having a pair of upwardly projecting lugs 50 adapted to impinge on said thrust plate 47 when operated by the foot of the driver of the vehicle to compress the springs 28 and cause a slight forward movement of the rotary frame heads to release the friction members. When this pressure of the lugs 50 is released by removing the foot of the driver said friction members are restored to friction generating position by the reaction of the springs 28, and the rotary frame.

In operation the engine is started in the conventional way, while the clutch 16 is disengaged or in neutral position. When the engine is started the rotations of the power or crank shaft are communicated to the clutch plate 31. To connect the power to drive the vehicle forward the foot is used first to apply pressure to the springs 28 and thereby release the clutch system. The clutch gear 16 is then, by a suitable hand lever (not shown), connected with the driven shaft gear 15 and then the pressure of the springs 28 released by raising the foot off the pedal thereby reclutching the rotating member 31 with the clutch member 35 having the hollow geared hub 36 and causing the rotation of said geared hub.

In said operation the rollers 39 become immediately locked with the hub and cause the sleeve 37 to rotate the latter in turn by the teeth thereof rotating the gears 45, 46 and 12ᵃ and the intermediate shaft 12 and the rotary frame all with a slow motion. As the pull lessens and the rotary frame gains momentum the gears being locked by the friction members 42 the speed of the rotary frame and shaft 12 is increased by reason of momentum of said frame. After the speed of the shaft 12 and the rotary frame have reached a certain degree of motion the drive of the mechanism including the rotary frame continues by reason of and through the gear plate 43, friction plates 42 and compound gears 45—46 to the larger gear 12ᵃ of the intermediate shaft 12. The change or transfer of power initially applied increases speed and momentum of the shaft and rotary frame and thereafter such variations as are caused by grades or other road conditions are overcome by control and regulation of the gas supply. The power initially applied is, of course, heavier than that subsequently necessary in ordinary running because of the momentum developed.

It will be obvious that the source of power for utilizing this transmission mechanism is not confined to an engine of the reciprocating type and that an engine producing a steady power such for example as the Diesel engine or an electric motor can be the source of power in which transmission is utilized.

In such case suitable and obvious controls are adopted in such utilizations to cut off or regulate the application of the power to the transmission mechanism which itself automatically cooperates in effecting such application of power.

In traveling on a level road with reciprocating engine the speed is varied by the gas supply control, the speed on such road being varied by varying the gas supply. The speed may be so far reduced, as in going up a hill, without reducing the gas supply as to cause the automatic changing of the drive through the lock roller connection described.

Ordinary hills can be negotiated on the up grade with the direct drive through the planetary system. In descending a hill the gears act as a brake and "back lash" to resist rapid descent. In descending a hill the shaft 14 operates as a driving shaft.

It will be observed that the gears and clutches are supported in the rotary frame and that the power applied to rotate the intermediate shaft 12 also rotates the rotary frame in the same direction as the direction of rotation of the intermediate shaft.

The advantage of the arrangement is that the gearing to drive the intermediate shaft is supported as a movable part instead in a relatively stationary structure and the same power that is used to drive the gears is also applied to the rotary frame and not absorbed by stationary supports for the gears and clutches.

Another gain is that the rotary frame, although of less speed than the fly wheel, supplements said fly wheel in maintaining momentum of the driven shafts and vehicle.

Variations in gravity conditions or load cause variations in the rotation of the intermediate shaft and therefore variations in the resistance of the gearing and the rotary frame so that the motion of the latter will lag in pulling as compared with the rotation of the intermediate shaft, the gears yielding by rolling in a direction opposed to the direction of the intermediate shaft and frame so that the locking engagement of the rollers 39 is effected. The effect would take place upon ascending an extremely and unusually steep grade. But when power is applied to a motor in non-operating position such locking takes place in order to overcome the inertia of the resting parts.

The clutch plates 31 and 32, being friction members, prevent the planetary carrier from rotating backwards in any normal load on the driven shaft.

If a reasonably abnormal load is imposed on the mechanism the rotation of the frame in its normal direction will be continued, but at a reduced speed, because of the differential ratios of the gears 44 and 45—46 and the possibility of angular slippage of the gears 44 and 45 in relation to each other overcoming the friction of plates 42, the frame members being in such case free to respond to the lower and more powerful speed drive set forth. It is thought, however, that any explosion engine can be stalled or the mechanism stripped by a greatly abnormal load.

What I claim is:

1. In a power transmitting mechanism, a power shaft, a driven shaft, a gear thereon, a rotary frame mounted to turn on said driven shaft, gearing mounted in said rotary frame engaged with the gear on the driven shaft, said gearing including a geared sleeve and roller lock means, clutch means associated with said frame adapted to cause the rotation of said gearing by said lock means when the power is applied to rotate the rotary frame and means actuating the rotating frame to hold said clutch means engaged, said clutch means being releasable by movement axially of the rotating frame.

2. In a power transmitting mechanism, a primary power shaft, a shaft to be driven thereby, a freely mounted frame rotatively mounted on said last named shaft, said frame including parts axially movable with relation to each other, two clutching and driving systems in said frame having interchangeable driven connectibility with said driven shaft, said connection being torque responsive with reference to the two systems by variation in the speed of the driven shaft.

3. In a power transmitting mechanism, a power shaft, a driven shaft, a gear fixed on said driven shaft, an axially movable rotary frame freely mounted to turn on said driven shaft, gears mounted in said rotary frame, one of which gears is engaged with said gear on the driven shaft, clutch means actuated by said frame to cause rotation of said gears, a slow driving means and a fast driving means for actuating the gear that drives the gear of the driven shaft, said slow driving means and fast driving means being torque responsive to variation of the speed of the driven shaft.

4. In a power transmitting mechanism, a power shaft, a shaft to be driven thereby provided with a gear fixed thereto, a frame mounted on said last named shaft, two systems of clutching and driving means associated with said frame for driving said driven shaft through its gears, one of said clutching means including a clutch member provided with a gear toothed hub, a gear toothed sleeve on said driven shaft around which shaft said hub is rotatable, rollers between said hub and sleeve adapted to lock said clutch member and sleeve together to start the rotation of the driven shaft through the gear toothed sleeve, said sleeve being automatically released after the starting rotation of said driven shaft and the rotation of said driven shaft continued by said gear toothed hub through the other system of said clutching and driving means.

5. In a power transmitting mechanism, a power shaft, a shaft to be driven thereby provided with a gear fixed thereto, a frame mounted on said last named shaft, two systems of clutching and driving means associated with said frame for driving said driven shaft through its gears, one of said clutching means including a clutch member provided with a gear toothed hub, a gear toothed sleeve on said driven shaft around which shaft said hub is rotatable, rollers between said hub and sleeve adapted to lock said clutch member and sleeve together to start the rotation of the driven shaft through the gear toothed sleeve, said sleeve being automatically released after the starting rotation of said driven shaft and the rotation of said driven shaft continued by said gear toothed hub through the other system of said clutching and driving means, said last named driving means and clutching means being of the planetary type.

6. In a power transmitting mechanism, a power shaft, a shaft to be driven thereby provided with a gear fixed thereto, a frame mounted on said last named shaft, two systems of clutching and driving means associated with said frame for driving said driven shaft through its gears, one of said clutching means including a clutch member provided with a gear toothed hub, a gear toothed sleeve on said driven shaft around which shaft said hub is rotatable, rollers between said hub and sleeve adapted to lock said clutch member and sleeve together to start the rotation of the driven shaft through said gear toothed sleeve, said sleeve being automatically released after the starting rotation of said driven shaft and the rotation of said driven shaft continued by said gear toothed hub through the other system of said clutching and driving means, said last named driving means and clutching means being of the planetary type, the operation of said two driving means being initially concurrent.

7. In a power transmitting mechanism, a power shaft, a shaft to be driven thereby provided with a gear affixed thereto, a frame on said shaft, gear means mounted in said frame engaging the gear of the driven shaft, two gear means of different ratio actuated by the power shaft for driving said engaging gear, one of said last named gear means driving said engaging gear initially at a slow speed and the other driving the same at a high speed and laterally shiftable friction plates between said last named gears tending to hold them from rotation.

8. In a power transmitting mechanism, a power shaft, a shaft to be driven thereby provided with a gear affixed thereto, a rotatable frame on said shaft, gear means mounted in said frame engaging the gear of the driven shaft and two gear means of different ratio with friction means between them, said gear means simultaneously actuated by the power shaft for driving said engaging gear, one of said last named gear means driving said engaging gear initially at a slow speed and the other driving the same at a high speed, said power shaft also causing the rotation of said rotatable frame.

9. In a power transmitting mechanism, a power shaft, a driven shaft, a gear on said driven shaft, a freely mounted axially movable rotary frame mounted to turn on said driven shaft, gearing mounted in said rotary frame engaged with the driven shaft, clutch means associated with and actuated by said frame adapted to cause rotation of said gearing when power is applied to rotate said frame, the rate of rotation of said rotary frame being torque responsive to variations in the speed of said driven shaft.

JAMES S. ALSPAUGH.